(12) United States Patent
Yang et al.

(10) Patent No.: US 9,468,909 B2
(45) Date of Patent: Oct. 18, 2016

(54) METAL OXIDE STABILIZED PLATINUM-BASED ORR CATALYST

(71) Applicant: Ford Global Technologies, LLC, Dearborn, MI (US)

(72) Inventors: Jun Yang, Bloomfield Hills, MI (US); Chunchuan Xu, Troy, MI (US); Patrick Pietrasz, Vancouver (CA); Kerrie Gath, Pitsfield, MI (US); Benjamin Pence, Dearborn, MI (US); Mark John Jagner, Ypsilanti, MI (US); James Waldecker, Plymouth, MI (US); Shinichi Hirano, West Bloomfield, MI (US); Michael Alan Tamor, Toledo, OH (US)

(73) Assignee: Ford Global Technologies, LLC, Dearborn, MI (US)

(*) Notice: Subject to any disclaimer, the term of this patent is extended or adjusted under 35 U.S.C. 154(b) by 57 days.

(21) Appl. No.: 14/316,945

(22) Filed: Jun. 27, 2014

(65) Prior Publication Data

US 2015/0375208 A1    Dec. 31, 2015

(51) Int. Cl.
| | |
|---|---|
| *H01M 4/92* | (2006.01) |
| *B01J 23/648* | (2006.01) |
| *B01J 37/025* | (2006.01) |
| *H01M 4/86* | (2006.01) |
| *B01J 21/18* | (2006.01) |
| *B01J 37/02* | (2006.01) |
| *B01J 35/00* | (2006.01) |

(52) U.S. Cl.
CPC ......... *B01J 23/6484* (2013.01); *H01M 4/8657* (2013.01); *H01M 4/926* (2013.01); *B01J 21/18* (2013.01); *B01J 35/0033* (2013.01); *B01J 37/0244* (2013.01); *Y02E 60/50* (2013.01)

(58) Field of Classification Search
CPC . B01J 37/0244; B01J 23/6484; H01M 4/926
See application file for complete search history.

(56) References Cited

U.S. PATENT DOCUMENTS

| | | | |
|---|---|---|---|
| 2002/0004453 A1* | 1/2002 | Haugen ............... | B01J 23/6486 502/339 |
| 2010/0210454 A1 | 8/2010 | Epshteyn et al. | |

(Continued)

FOREIGN PATENT DOCUMENTS

WO    2010065014 A1    6/2010

OTHER PUBLICATIONS

Xu et al., "Pt-based ORR Catalyst on Carbon-Supported Amorphous Niobium Oxide Support," ECS Transactions 58(1), pp. 1779-1788, Oct. 2013.*

(Continued)

*Primary Examiner* — Melvin C Mayes
*Assistant Examiner* — James Corno
(74) *Attorney, Agent, or Firm* — Damian Porcari; Brooks Kushman P.C.

(57) ABSTRACT

In at least one embodiment, an oxygen reduction reaction catalyst (ORR) and a method for making the catalyst are provided. The method may include depositing a metal oxide on a graphitized carbon or graphene substrate. A platinum catalyst may then be deposited over the metal oxide to provide an ORR catalyst for use in, for example, a PEMFC. The metal oxide may be niobium oxide and may have an amorphous structure. The platinum catalyst may form a thin, electrically interconnected network structure overlaying the metal oxide. The ORR catalyst may be prepared by alternating the deposition of the metal oxide and the platinum catalyst, for example, using physical vapor deposition. The ORR catalyst may have a specific activity of at least 1,000 $\mu A/cm^2$ Pt and may approach or achieve bulk Pt activity.

20 Claims, 10 Drawing Sheets

(56) References Cited

U.S. PATENT DOCUMENTS

2012/0183869 A1     7/2012    Jin et al.
2013/0330650 A1    12/2013    Sharman et al.

OTHER PUBLICATIONS

Zhang et al., "Oxygen Reduction Reaction Activity and Electrochemical Stability of Thin-Film Bilayer Systems of Platinum on Niobium Oxide," The Journal of Physical Chemistry C 114(39), pp. 16463-16474, Sep. 2010.*

Pham et al., "Improved hydrothermal stability of niobia-supported Pd catalysts," Applied Catalysis A: General 397(1-2), pp. 153-162, Apr. 2011.*

Tang et al., "Preparation, Structure, and Electrochemical Properties of Reduced Graphene Sheet Films," Advanced Functional Materials 19(17), pp. 2782-2789, Jun. 2009.*

Xu, Chunchuan et al., "Pt-Based ORR Catalyst on Carbon-Supported Amorphous Niobium Oxide Support," Abstract #1620, 224th ECS Meeting, 2013 The Electrochemical Society.

* cited by examiner

METAL OXIDE STABILIZED PLATINUM-BASED ORR CATALYST

TECHNICAL FIELD

The present disclosure relates to a metal oxide stabilized platinum-based oxygen reduction catalyst, for example, for use in fuel cells.

BACKGROUND

A durable, highly active oxygen reduction reaction (ORR) catalyst is an important candidate in developing proton exchange membrane fuel cell (PEMFC) vehicles. For many years, it has been known that carbon-supported platinum (Pt) based particles can be used as an oxygen reduction catalyst. However, Pt-based ORR catalysts often have issues with durability, due to the wide range of operating voltages that may be experienced in a single cell. These voltage ranges can stress both the Pt catalyst and/or the carbon substrate. Ways to improve the durability of the ORR catalyst and to enhance the reaction activity have been the focus of world-wide research for the past several decades.

SUMMARY

In at least one embodiment, an oxygen reduction reaction (ORR) catalyst is provided. The catalyst includes a carbon substrate, a first amorphous metal oxide layer overlying a surface of the substrate, a first platinum layer overlying the first metal oxide layer, a second amorphous metal oxide layer overlying the first platinum layer, and a second platinum layer overlying the second amorphous metal oxide layer. The amorphous metal oxide layers may include a plurality of discontinuous elongated structures.

The amorphous metal oxide layer may include a niobium oxide material and the platinum layer may include pure platinum or a platinum alloy. The carbon substrate may include graphitized carbon or graphene. The platinum layers may have a thickness of 1-20 atomic layers and may each include an electrically interconnected network of platinum. The electrically interconnected network of platinum may form a plurality of openings within the network. In one embodiment, the first and second platinum layers are substantially discrete from each other and separated by the second amorphous metal oxide layer. The ORR catalyst may have a specific activity of at least 1,000 $\mu A/cm^2$ Pt or a specific activity of 1,200 $\mu A/cm^2$ Pt to 2,000 $\mu A/cm^2$ Pt. In one embodiment, the amorphous metal oxide layers include a plurality of discontinuous elongated structures having a long axis of 2 to 50 nm and a short axis of 1 to 10 nm.

In at least one embodiment, an ORR catalyst is provided that includes a carbon substrate and a plurality of alternating layers of amorphous metal oxide and platinum catalyst material overlying the substrate. The layers of amorphous metal oxide may include a plurality of discontinuous elongated structures and the layers of platinum catalyst material may each include an electrically interconnected network of platinum.

The carbon substrate may include graphitized carbon or graphene and the layers of amorphous metal oxide may include niobium oxide and the layers of platinum catalyst material may include pure platinum or a platinum alloy. In one embodiment, a first layer of amorphous metal oxide is in contact with the carbon substrate and the layers of platinum catalyst material are substantially discrete from each other and separated by the layers of amorphous metal oxide. The catalyst may have a specific activity of 1,200 $\mu A/cm^2$ Pt to 2,000 $\mu A/cm^2$ Pt. In one embodiment, the layers of platinum catalyst may have a thickness of 1 to 20 atomic layers. In another embodiment, the layers of platinum catalyst may have a thickness of 2-5 atomic layers.

In at least one embodiment, a method of forming an ORR catalyst is provided. The method includes depositing a first metal oxide layer onto a carbon substrate, depositing a first platinum layer onto the metal oxide layer, depositing a second metal oxide layer onto the first platinum layer, and depositing a second platinum layer onto the second metal oxide layer. The method may form alternating layers of platinum and amorphous metal oxide including a plurality of discontinuous elongated structures.

The deposition of the metal oxide layers may include depositing niobium oxide. The deposition of the metal oxide layers and the deposition of the platinum catalyst layers may be performed by physical vapor deposition. The deposition of the first metal oxide layer may include depositing onto a graphitized carbon or graphene substrate. The deposition of the first and second platinum layers may include depositing from 1 to 20 atomic layers of platinum or platinum alloy. The deposition of the first and second platinum layers may each include depositing an electrically interconnected network of platinum or platinum alloy.

DETAILED DESCRIPTION

Reference will now be made in detail to the embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

There is still a need for improved platinum based ORR catalyst designs, and methods of making such catalysts. As a substrate for oxygen reduction reaction catalysts, graphene is the most stable carbon, but it is hard to obtain in spherical shape as nano-particles. Its application as the ORR catalyst primary support is impractical at present. Nano-particles are desired since they have a high surface area which results in an increase in reaction activity. Since the surface atoms of graphitized carbon are close to those of graphene in terms of surface carbon atomic arrangement and bonding, it can be used as a substitute for graphene. Platinum (Pt) based particles that are wet-chemically coated onto amorphous or graphitized carbon have been used as ORR catalysts. Graphitized carbon is a relatively stable support that imparts improvement of catalyst durability compared to Pt on Vulcan XC-72R, a carbon black manufactured by Cabot Corporation. A platinum based oxygen reduction catalyst on graphitized carbon, such as TKK EA carbon from Tanaka Kikinzoku Kogyo K.K. has improved durability, however, its ORR activity does not exhibit long-term stability. The electrochemical surface area measured by hydrogen desorption (ECSA) and ORR activity at 0.9V decreases with increased potential cycling, indicating that the Pt is not interconnected and that agglomeration and dissolution still occur when graphitized carbon is used.

Fuel cell and energy storage devices lack efficient and stable catalysts. Embodiments of the present invention provide a metal oxide stabilized platinum-based oxygen reduction reaction catalyst that offers proven activity while maintaining exceptional durability and long-term stability. The activity and durability properties of the disclosed ORR catalyst may be due to the preparation methods used.

Figures 1A, 1B, 1C:
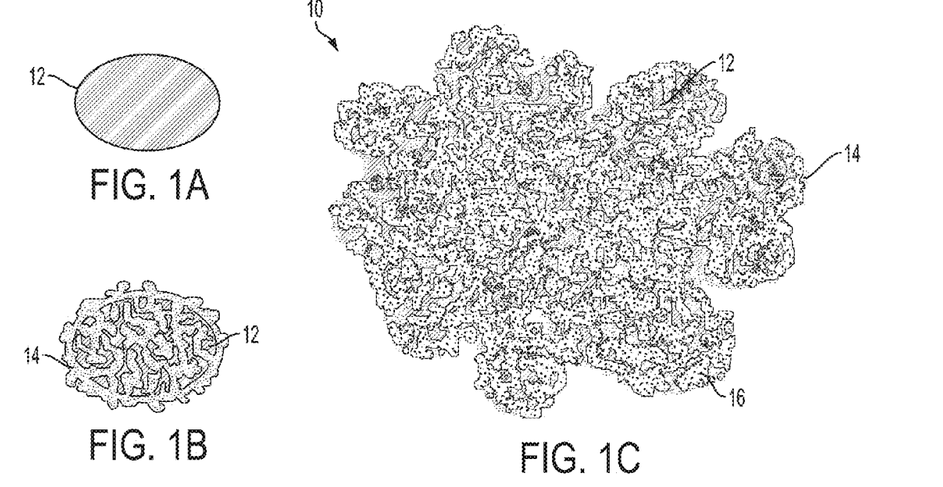
FIG. 1A-1C are schematic views of a bare substrate, a substrate having a metal oxide coating, and a substrate having a metal oxide coating and a platinum ORR catalyst deposited thereon.
Figure 2:
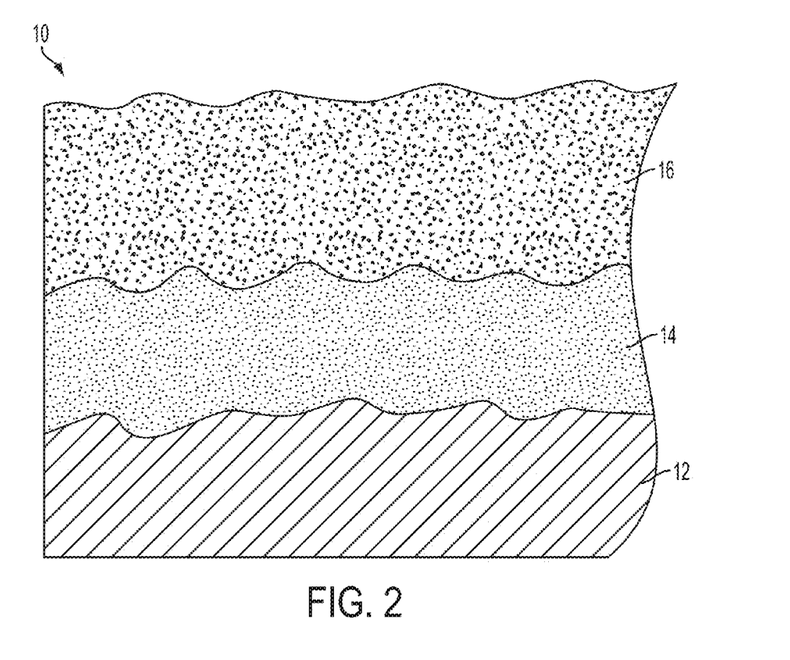
FIG. 2 is a schematic cross-sectional view of a thin film platinum-based ORR catalyst incorporating an amorphous metal oxide layer according to an embodiment.

Referring now to FIGS. 1-4, a platinum-based oxygen reduction catalyst incorporating an amorphous metal oxide layer is provided. The catalyst can optionally be a component of a variety of electrochemical cells. Examples of suitable applications include embodiments wherein the catalyst is incorporated into thin film batteries, supercapacitors, fuel cells (e.g., PEMFC) and the like. Oxygen reduction catalyst 10 includes a substrate 12, and an amorphous metal oxide layer 14. Disposed over the amorphous metal oxide layer 14 is a platinum catalyst 16. Unless otherwise specified, the platinum catalyst may be a platinum-based material or platinum containing material, which may include pure metallic platinum or a platinum alloy. FIG. 1A shows a schematic of the substrate 12, which may include graphitized carbon particles/powder or graphene, without the metal oxide layer 14. FIG. 1B shows a schematic of the substrate 12 with the metal oxide layer 14 disposed thereon. FIG. 1C shows a schematic of the substrate 12 with the metal oxide layer 14 and a platinum catalyst 16 disposed on the metal oxide layer 14. FIG. 2 shows a schematic cross-section of the catalyst 10.

The metal oxide layer 14 may inhibit the Pt catalyst 16 from agglomeration under repeated end use cycling. The amorphous metal oxide layer 14 may be described as having a worm-like structure. The metal oxide layer 14 may include a plurality of discrete, discontinuous, and/or disconnected elongated structures. The elongated structures may contact one another, however, in at least one embodiment the layer 14 is not continuous over the entire surface of the substrate 12 (i.e., some of the substrate is exposed). The metal oxide layer 14 may therefore provide the overlying Pt catalyst with a large surface area for promoting the electrochemical reaction.

Figure 3A:
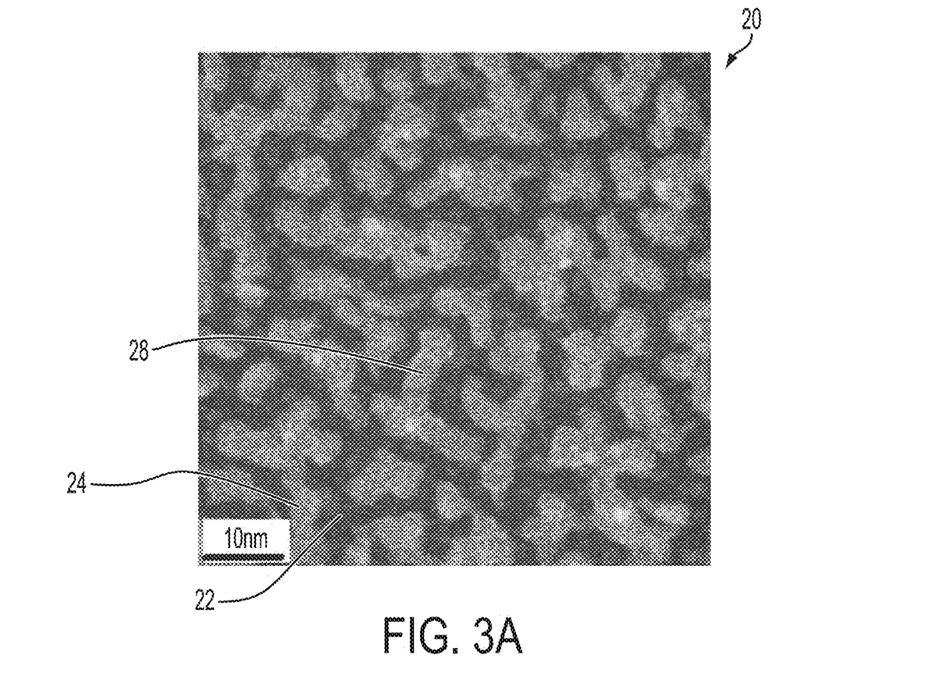
FIG. 3A is a scanning transmission electron microscope image showing a plurality of worm-like or discrete, discontinuous elongated structures of the metal oxide layer with a graphitic substrate, according to an embodiment.
Figure 3B:
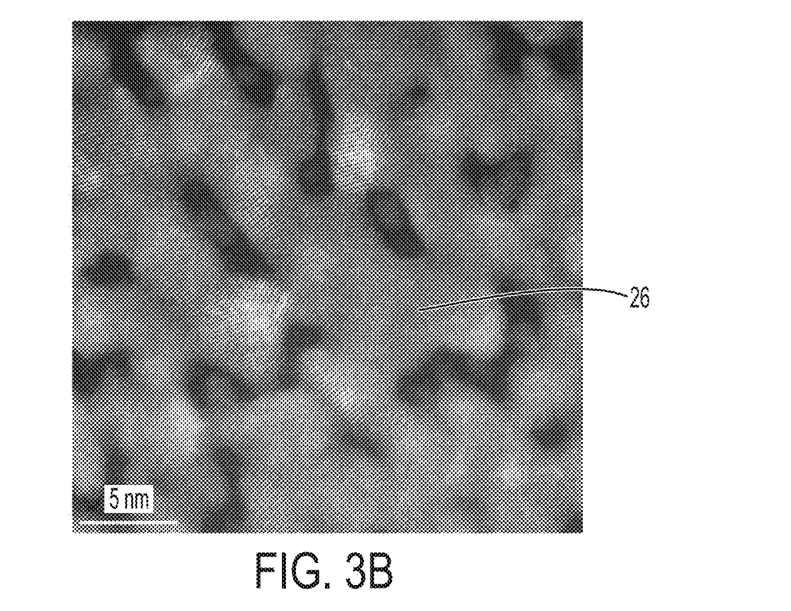
FIG. 3B is a scanning transmission electron microscope image showing the structure of Pt on the worm-like or discrete, discontinuous elongated structures of the metal oxide layer with a graphitic carbon substrate, according to an embodiment.

With reference to FIG. 3A, a scanning transmission electron microscope (STEM) image 20 of a metal oxide layer on a substrate is provided. The substrate 22 is shown of graphitized carbon with an overlying metal oxide layer 24 of niobium oxide ($NbO_x$) having a plurality of discrete, discontinuous elongated structures 28. FIG. 3B shows a scanning transmission electron microscope image of a two-dimensional (2-D) connected platinum catalyst 26 overlying the metal oxide layer on the graphitized carbon substrate 22. It can be seen that the Pt catalyst 26 is crystalline, and mainly forms on top and around the junction between $NbO_x$ and graphitic carbon, and some has formed a 2-D connected Pt network morphology.

As used herein, a 2-D structure is one in which the thickness dimension is much smaller than the in-plane dimensions of the structure, such as in a sheet of paper. The structure has a thickness, but the thickness in the z-direction (perpendicular to the surface plane of the substrate) is much smaller than the dimensions of the x and y directions (parallel to the surface plane of the substrate). In at least one embodiment, the 2-D Pt catalyst layer may have a thickness of up to 100 atomic layers. The Pt catalyst layer may be thicker than 100 atomic layers; however, thicker layers may use more Pt than necessary, thereby increasing costs without significant additional catalytic activity.

The Pt catalyst layer may also be connected, which may mean electrically connected. In one embodiment, the Pt catalyst layer may include an electrically interconnected network of Pt. The network of Pt may be "open," in that it includes a plurality of openings formed or defined therein (e.g., not a single continuous sheet). Thin layers of Pt that are electrically connected, in contrast to a plurality of separated Pt particles, may provide increased catalytic activity. Discrete particles of Pt have significantly lower specific catalytic activity (about 200-400 $\mu A/cm^2$ Pt) than bulk Pt (about 2,000 $\mu A/cm^2$ Pt). It has been found that thin, electrically connected layers of Pt may have specific activities that approach or achieve the specific activity of bulk Pt, but with substantially reduced Pt loading. Electrically interconnected Pt networks may therefore provide very high specific activities (e.g., at or close to bulk Pt) with reduced Pt content, thereby reducing costs without sacrificing activity. For example, the Pt loading of the catalysts 10 and 20 may be from 1 to 25 wt %, or any sub-range therein, such as 2 to 25 wt %, 3 to 25 wt %, 5 to 25 wt %, 5 to 15 wt %, or 5 to 10 wt %. In one embodiment, the Pt loading of the catalyst is about 5 wt %.

The metal oxide layer 24 may include worm-like or discrete, discontinuous elongated structures, and may be referred to as a thin film layer. The metal oxide layer 24 may have a thickness from about 5 angstroms to about 1 μm. The metal oxide layer 24 may have a thickness sufficient to form the worm-like or discrete elongated structures but the thickness may be limited so as to not result in a continuous coverage of the substrate. Thicker metal oxide layers tend to form continuous coverage and can grow without the worm-like structure. The metal oxide layer 24 may have (e.g., is deposited at) a physical thickness of less than 1000 angstroms. In other embodiments, the layer 24 has a thickness of less than 500 angstroms, less than 300 angstroms, or less than 100 Å. The worm-like or elongated structures may be irregularly shaped, but may generally have a long axis and short axis (e.g., length and width for substantially rectangular shaped structures). In one embodiment, the structures may have a long axis of 2 to 50 nm, or any sub-range therein, for example, 2 to 30 nm, 5 to 25 nm, 5 to 20 nm, or 5 to 15 nm. The structures may have a short axis of 1 to 10 nm, or any sub-range therein, for example, 1 to 8 nm or 2 to 6 nm.

Layer 24 may comprise, consist essentially of, or consist of, a metal oxide. In other embodiments, layer 24 may comprise, consist essentially of, or consist of, sub-stoichiometric metal oxide (MOx where x is less than 2.5). The metal oxide layer may comprise one or more materials, such as oxides of niobium, molybdenum, tungsten, tantalum, titanium, indium, zinc and tin or combinations thereof. In one embodiment, a major percentage (e.g. by weight) of the layer 24 is niobium. The metal oxide layer may also contain a mixture of two or more oxides. In one embodiment, the metal oxide layer may be 100% niobium oxide. In another embodiment, the metal oxide layer is partially niobium oxide and the remaining composition is other oxides and dopants. The percent niobium oxide in the metal oxide layer can range from 0 to 100%, and in certain embodiments from 50% to 80% and in other embodiments more than 80%.

In one embodiment, the metal oxide layer may be conductive. Conductivity can range from $10^2$ to $10^4$ /ohm centimeter. In some embodiments, the metal oxide layer may be doped to increase electrical conductivity. The metal oxide layer may also be a cermet, containing both oxides and a metal for doping.

Structure zone models may be used to predict the microstructure of thin films. Generally, the zone model predicts that thin films deposited at less than 30% of their melting temperature will have an amorphous structure, and those deposited at temperatures greater than 30% of their melting temperature will be crystalline. Deposition temperature may play a role in the resulting structure of the disclosed metal oxide layer and, in one embodiment, niobium oxide may be chosen as the metal oxide layer because it is amorphous structurally and grows in a worm-like pattern or includes discrete, discontinuous elongated structures.

Figure 4A:
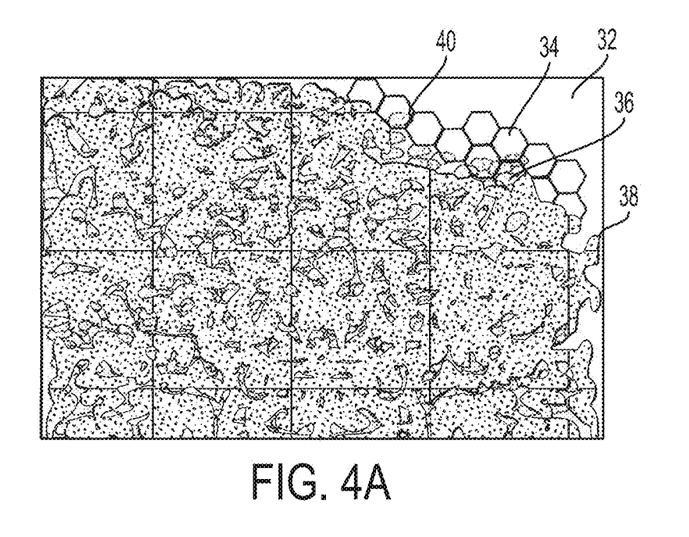
FIG. 4A is a schematic top view of a catalyst overlaying a metal oxide layer on a substrate in accordance with an embodiment.
Figure 4B:
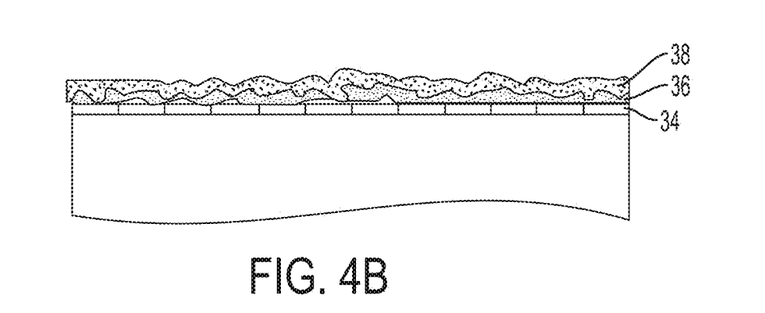
FIG. 4B is a schematic side view of a catalyst overlaying a metal oxide layer on a substrate in accordance with an embodiment.
Figure 4C:
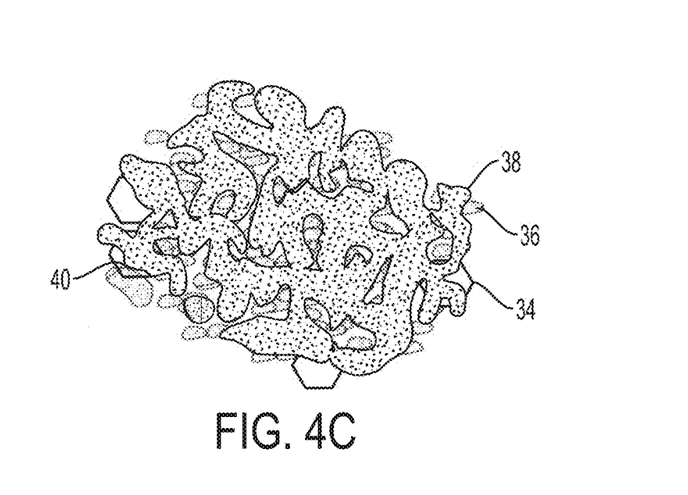
FIG. 4C is an expanded top view of FIG. 4A.

Referring now to FIG. 4A, a schematic top view of the structure of the Pt ORR catalyst is shown. The carbon substrate 32, the graphitized carbon 34, the metal oxide discrete, discontinuous elongated structures 36 and the continuous Pt catalyst 38 according to one embodiment are illustrated. While the substrate is shown as graphitized carbon, it may be alternatively include graphene. During the initial stages of growth, the Pt catalyst 38 tends to form at the junction of the interface 40 of the graphitized carbon substrate 44 and the amorphous metal oxide layer 46, shown in FIG. 4C. The atomic deposition processes may occur under vacuum to enable the growing film, the Pt catalyst layer 38, to form with a desired arrangement, which can follow the underlying structure, that of metal oxide layer 36. FIG. 4B is the side view of the schematic illustrated in FIG. 4A. Referring again to FIG. 4C, it is an expanded schematic top view of FIG. 4A showing the graphitized carbon substrate 34, the metal oxide discrete, discontinuous elongated structures 36, the continuous Pt catalyst 38 and the interface 40 of the graphitized carbon substrate 34 and the amorphous metal oxide layer 36 shown.

Referring again to FIGS. 1 and 2, the catalyst layer 16 is deposited onto the amorphous metal oxide layer 14 by any number of vacuum deposition techniques known to those skilled in the art of thin film deposition. Examples of useful vacuum techniques include, but are not limited to, physical vapor deposition or sputtering (e.g., arc plasma deposition), chemical vapor deposition, plasma assisted chemical vapor deposition, ion beam deposition and the like. The metal oxide layer 14 and the catalyst layer 16 may be formed or deposited using the same or different deposition techniques. In one embodiment, temperature controlled arc plasma deposition is used to deposit both the metal oxide layer 14 and the catalyst layer 16. In at least one embodiment, the catalyst layer 16 and/or the metal oxide 14 are not deposited using wet chemical techniques.

Figure 5A:
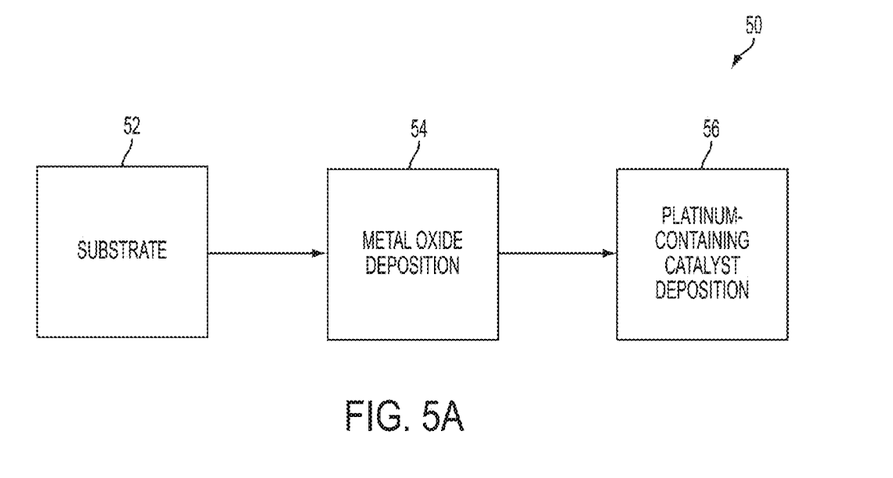
FIGS. 5A and 5B are flow charts describing embodiments of methods of making a Pt based oxygen reduction reaction catalyst.
Figure 5B:
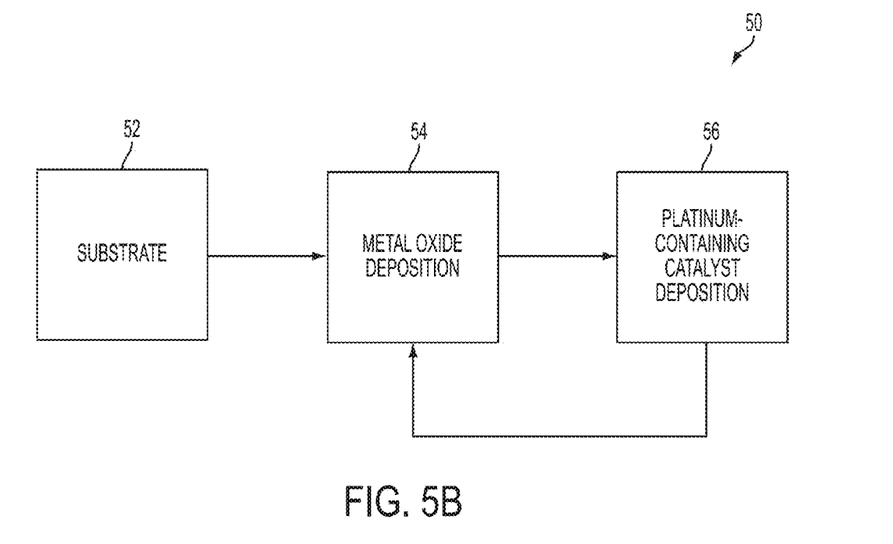

Referring now to FIG. 5, methods 50 of forming the platinum oxygen reduction reaction catalyst are shown schematically. The substrate may be provided at step 52, which may be graphitized carbon powder or particles or graphene. The substrate is then coated 54 with a metal oxide layer. The metal oxide layer may be conductive and amorphous and may have a plurality of discrete, discontinuous elongated structures. In at least one embodiment, the metal oxide layer is a niobium oxide layer ($NbO_x$). A platinum film having an electrically interconnected Pt network structure may then be deposited 56 onto the metal oxide layer. The coating 54 of the metal oxide layer and the depositing 56 of the platinum catalyst may be performed sequentially (e.g., the metal oxide layer is completely formed and then the platinum catalyst layer is completely formed), as shown in FIG. 5A or the two layers may be deposited in an alternating fashion, as shown in FIG. 5B.

In one embodiment, the coating 54 of the metal oxide layer and the depositing 56 of the platinum catalyst may be performed sequentially, for example, using physical vapor deposition. The metal oxide layer may be deposited on the substrate to form a plurality of discrete, discontinuous elongated structures. Once the metal oxide layer is deposited, a layer of platinum catalyst may be deposited to form the electrically interconnected Pt network structure, described above. The platinum catalyst layer may have a thickness of 2 to 100 atomic layers, or any sub-range therein. For example, the Pt catalyst layer may have a thickness of 5 to 100, 10 to 50, 15 to 30, or 20 to 25 atomic layers.

In another embodiment, the coating 54 of the metal oxide layer and the depositing 56 of the platinum catalyst may be performed in an alternating fashion, for example, using physical vapor deposition. The alternating deposition may be accomplished using a single PVD device having at least a metal oxide target material and a platinum-based target material. The deposition of the metal oxide layer and the platinum catalyst may include alternating deposition of the metal oxide layer and the platinum catalyst layer in cycles until the enough material has been deposited so that the layers are sufficiently thick and cover a sufficient area. For example, the deposition may be alternated until the metal oxide has formed the described worm-like or discrete, discontinuous elongated structures and the platinum catalyst has formed the described electrically interconnected Pt network structure.

In at least one embodiment, a temperature-controlled arc plasma deposition method may be used to deposit a metal oxide layer and a platinum catalyst layer onto a graphitized carbon or graphene substrate. The deposition may be done sequentially, simultaneously or in an alternating fashion. The arc plasma deposition may be carried out at a temperature of 250 to 700° C. or at any sub-range of temperatures therein, such as 350 to 650° C. The deposition may be carried out for a number of pulses (voltage pulse into the plasma that triggers the deposition) for the metal oxide layer and the platinum catalyst layer. In one embodiment, each layer may be formed from 5,000 to 40,000 pulses, or any sub-range of pulses therein, such as 10,000 to 30,000 or 15,000 to 25,000. The metal oxide layer and the platinum catalyst layer may be formed using the same number of pulses each or one may be formed using more pulses than the other. In embodiments where alternating deposition of the metal oxide layer and the platinum catalyst layer is performed, the deposition may include alternating single pulses or it may include alternating a plurality of pulses of each material (e.g., five pulses of metal oxide, then five pulses of platinum catalyst, repeat).

Figure 6A:
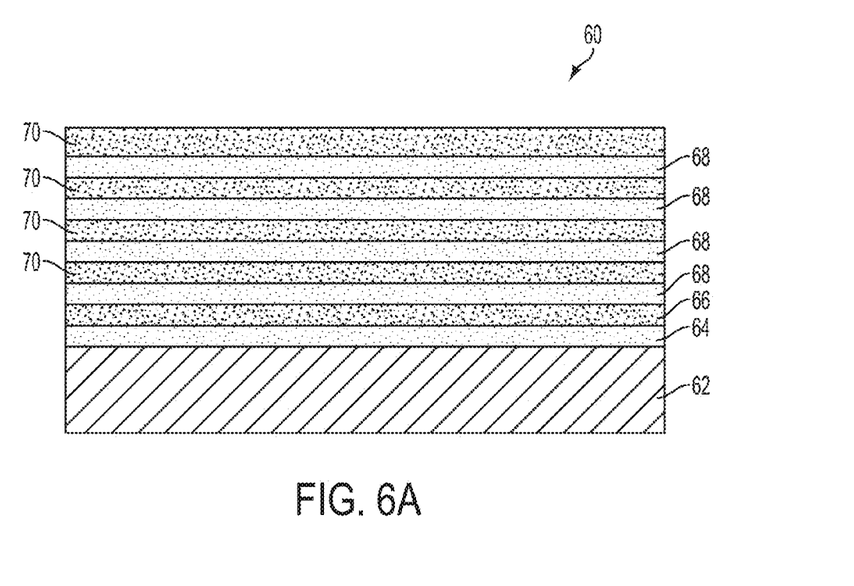
FIG. 6A is a schematic cross-section of a catalyst formed from an alternating deposition method according to an embodiment.
Figure 6B:
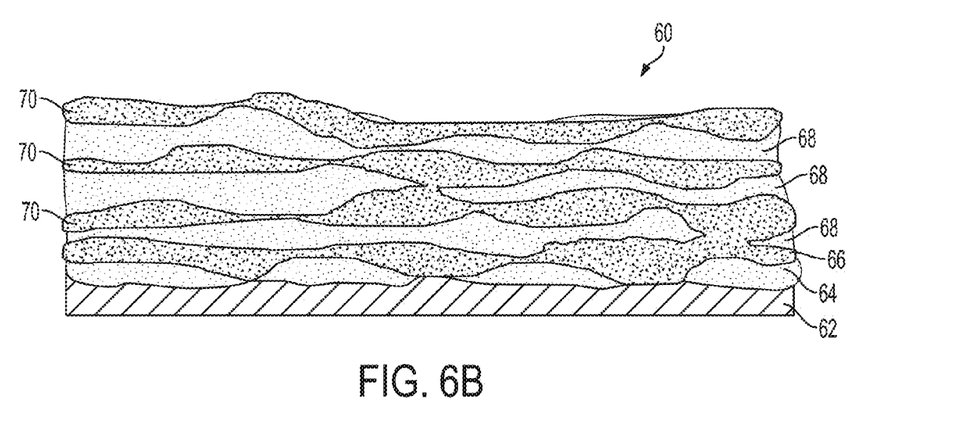
FIG. 6B is a schematic cross-section of a catalyst formed from an alternating deposition method according to another embodiment

Schematic cross-sections of a metal oxide stabilized platinum ORR catalyst 60 formed according to an alternating deposition process, such as described with reference to FIG. 5B, is shown in FIGS. 6A-6B. The substrate 62 may be a graphitized carbon or graphene similar to the substrates described in FIGS. 1-4. In one embodiment, the substrate 62 may be graphitized carbon particles having a size or diameter of 10 to 100 nm, or any sub-range therein. For example, the particles may have a size of 15 to 75 nm, 20 to 50 nm, or about 30 nm. In another embodiment, the substrate 62 may be graphene having a thickness of 1 to 15 nm, or any sub-range therein. For example, the thickness may be from 2 to 15 nm, 5 to 10 nm, or about 8 nm. The graphene may have a diameter or in-plane dimension of up to about 1 µm, for example, up to 0.5 µm or up to 0.3 µm.

Overlying the substrate 62 is a first metal oxide layer 64. This layer may be similar to the metal oxide layers described with reference to FIGS. 1-4 (e.g, forming a plurality of discrete, discontinuous elongated structures), but may be thinner. Overlying the first metal oxide layer 64 is a first platinum layer 66, which may be similar to the platinum layers described with reference to FIGS. 1-4 (e.g., forming an electrically interconnected Pt network structure), but may be thinner such that about the same amount of Pt is present in the catalyst 60 as in the catalysts 10 and 20 (e.g., 5-25 wt %). As a result of the alternating deposition process, there may be one or more additional metal oxide layers 68 and one or more additional platinum layers 70 in an alternating configuration overlaying the first platinum layer 66.

The layers of metal oxide and platinum may be substantially uniform in thickness, as shown in FIG. 6A. However, in some embodiments the thickness of each layer may vary in the in-plane direction (e.g., x and y directions), as shown in FIG. 6B, due to variations in processing conditions, equipment tolerances, surface roughness, or other reasons. In at least one embodiment, the layers remain discrete or distinct from each other in that the spaced platinum layers do not contact one another and the spaced metal oxide layers do not contact one another. As illustrated in FIG. 6B, the spaced platinum or metal oxide layers may be substantially discrete or distinct from each other in that they rarely contact one another (e.g., less than 1% of the top and bottom surface areas of each layer are contacting another layer of the same type, such at Pt—Pt). For example, if an intermediate metal oxide layer is relatively thin in a certain region, two Pt layers may contact each other over a very small area in that region. In one embodiment, at least a majority of each platinum layer 66, 70 is supported on a metal oxide layer 64, 68. In another embodiment, all or substantially all of each platinum layer 66, 70 is supported on a metal oxide layer 64, 68 (e.g., at least 95% of the bottom surface area of each layer).

The thicknesses of all of the layers may be the same or substantially the same. Alternatively, the metal oxide layers may have the same or substantially the same thicknesses and/or the platinum layers may have the same or substantially the same thicknesses. In addition, one or more layers may have the same thicknesses while others have different thicknesses, or all layers may have different thicknesses. The thicknesses of each layer may be determined based on the deposition conditions, such as the number of pulses. The thickness of the Pt catalyst layers may be 1 to 20 atomic layers, or any sub-range therein. For example, the Pt layers may be 1 to 10 or 2 to 5 atomic layers.

In embodiments where the catalyst 60 includes alternating layers of metal oxide and platinum, there are at least two layers of each (e.g., $MO_x$—Pt-$MO_x$—Pt). Any suitable number of layers of each material may be deposited, for example, 2 to 10 layers, 2 to 8 layers, or 2 to 5 layers. More layers may be deposited, however, if the number of layers is too high then the total platinum consumption may become cost prohibitive. In at least one embodiment, the number of each layers is the same (i.e., there is a Pt layer for every $MO_x$ layer and vice versa). However, there may be different numbers of layers, if desired. For example, the top layer of the $MO_x$-Pt stack could be a metal oxide layer (meaning there is one more $MO_x$ layer than Pt layer) in order to further enhance the pinning of the Pt material (discussed in more detail, below).

Figure 7A:
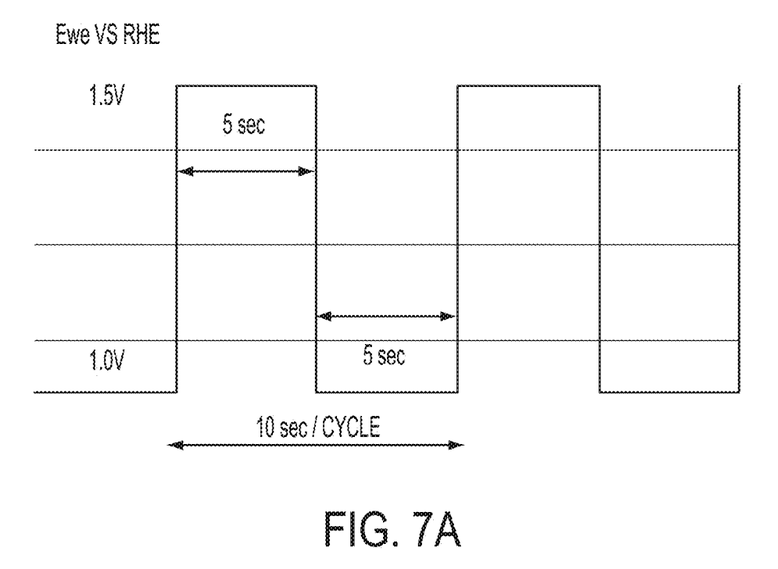
FIGS. 7A and 7B are schematic illustrations of stress tests performed on the substrate of the ORR catalyst and the platinum catalyst, respectively.
Figure 7B:
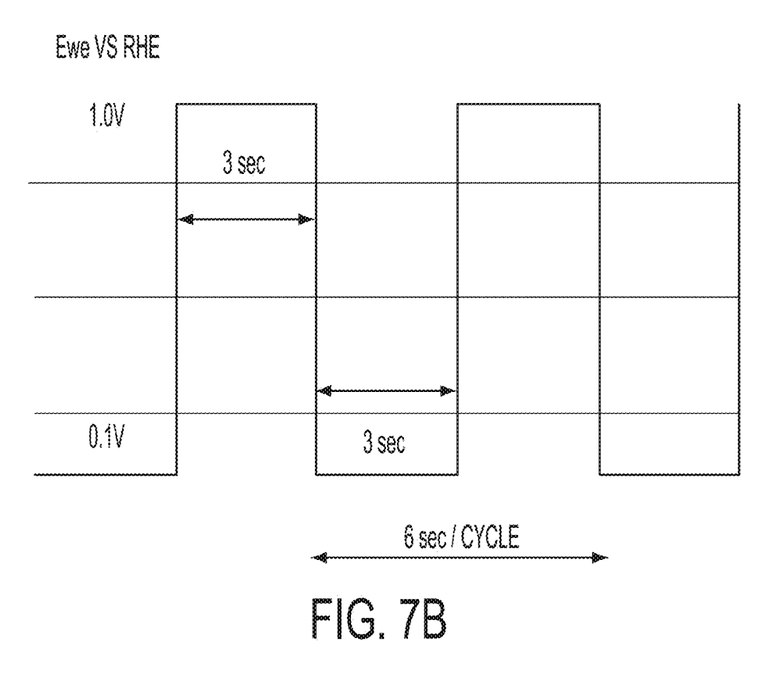

With reference to FIGS. 7A and 7B, the durability and the stability of ORR catalysts produced by the methods of the present disclosure were tested using accelerated stress tests. To test the durability and stability of the substrate (e.g., graphitized carbon powder), the ORR catalysts were cycled between 1.0 and 1.5 V for 5 seconds each (10 seconds per total cycle) for over 15,000 cycles, as shown in FIG. 7A. The test was performed in 0.1 mol $HClO_4$ at 35° C. using a rotating disk electrode (RDE) with a tip rotation speed of 400 RPM, saturated by $O_2$ gas. To test the durability and stability of the catalyst (e.g., electrically interconnected Pt network layer), the ORR catalysts were cycled between 0.1 and 1.0 V for 3 seconds each (6 seconds per total cycle) for over 20,000 cycles, as shown in FIG. 7B. The test was performed in 0.1 mol $HClO_4$ at 35° C. using an RDE with a tip rotation speed of 400 RPM, saturated by $O_2$ gas. The same tests were performed on ORR catalysts in which Pt was deposited directly onto graphitized carbon, with no metal oxide layer.

Figure 8A:
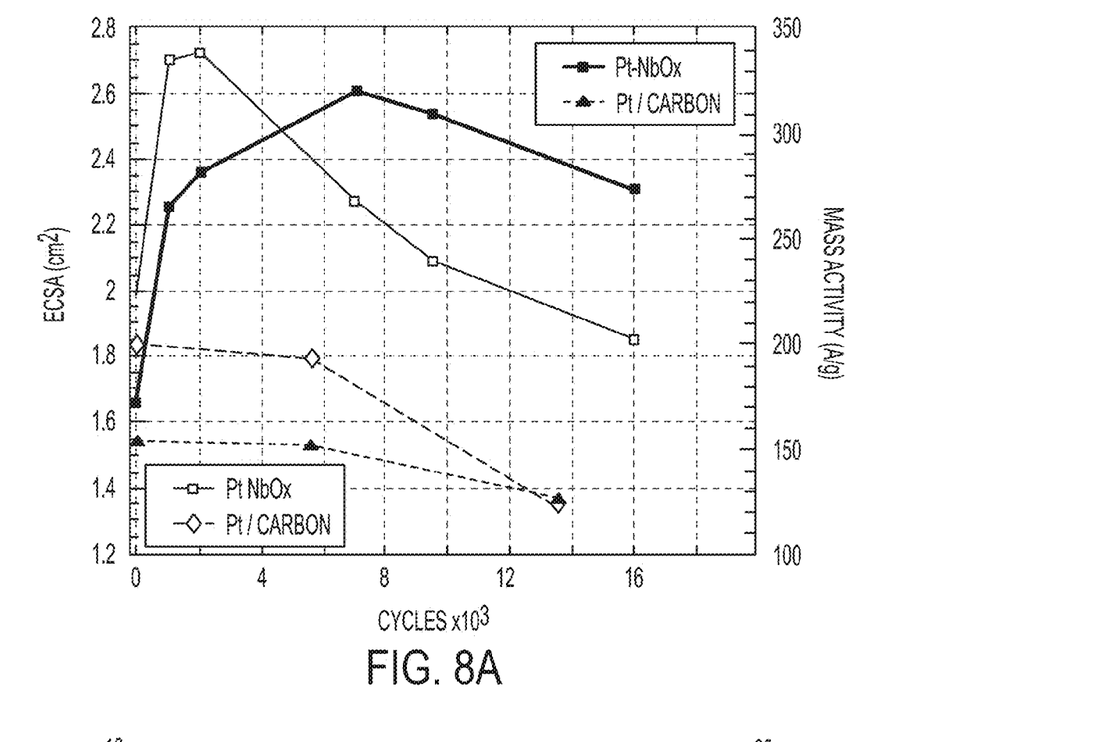
FIGS. 8A and 8B are the results of electrochemical surface area (ECSA) and mass activity tests performed with the stress tests of FIGS. 6A and 6B.
Figure 8B:
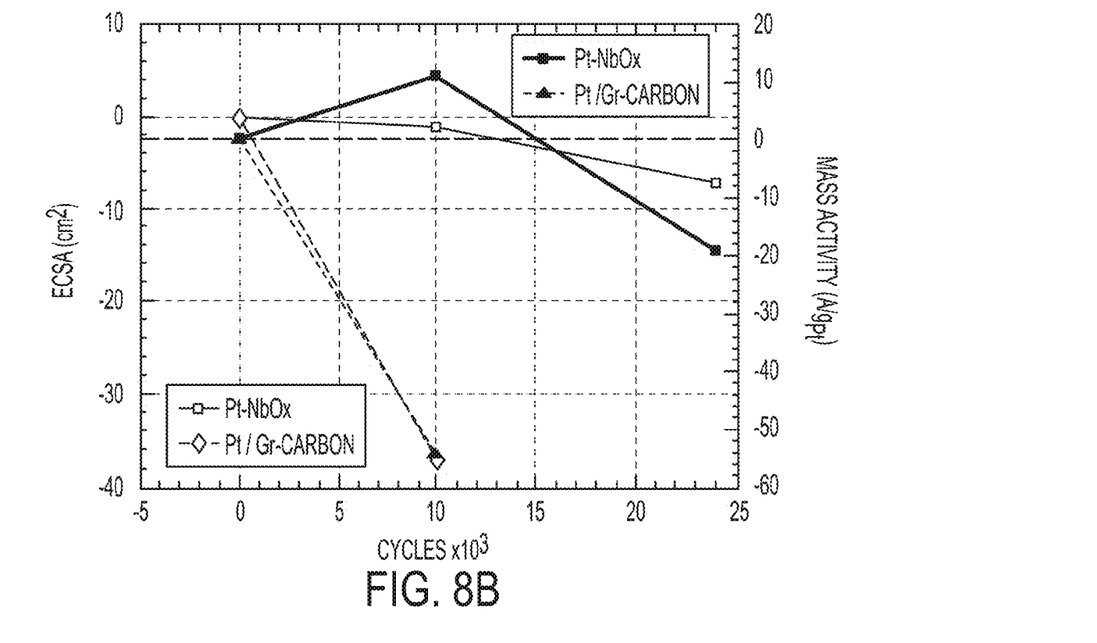

The results of the stress tests are shown in FIGS. 8A and 8B, FIG. 9, and FIGS. 10A, 10B, and 10C. FIG. 8A shows the electrochemical surface area (ECSA) and mass activity results of the substrate stress test of the Pt—NbOx-graphitized carbon ORR catalyst and the Pt-graphitized carbon ORR catalyst. As shown in the graph, the Pt—NbOx-graphitized carbon catalyst shows significantly improved ECSA and mass activity compared to the Pt-carbon catalyst at all cycle numbers. Similarly, as shown in FIG. 8B, the Pt—NbOx-graphitized carbon catalyst also shows significantly improved ECSA and mass activity compared to the Pt-carbon catalyst at all cycle numbers during the catalyst stress test. ECSA is the electrochemically active surface area of the Pt catalyst. Changes in the ECSA during cycling may reflect the relative stability of the catalyst: the larger the change, the less stable/durable. Another indicator of durability and stability is mass activity. Compared to ECSA, mass activity is a direct indication of the durability/stability of the catalyst. As seen in FIGS. 8A and 8B, the ECSA and the mass activity of the Pt-carbon catalyst decline immediately and continue to decline over time, which is a result of the Pt dissolution and agglomeration that begin immediately after it is put to use. In comparison, the ECSA and mass activity of the Pt—NbOx-graphitized carbon rise initially and then decline slowly as the cycling continues, indicating much greater stability than the Pt-carbon catalyst.

Figure 9:
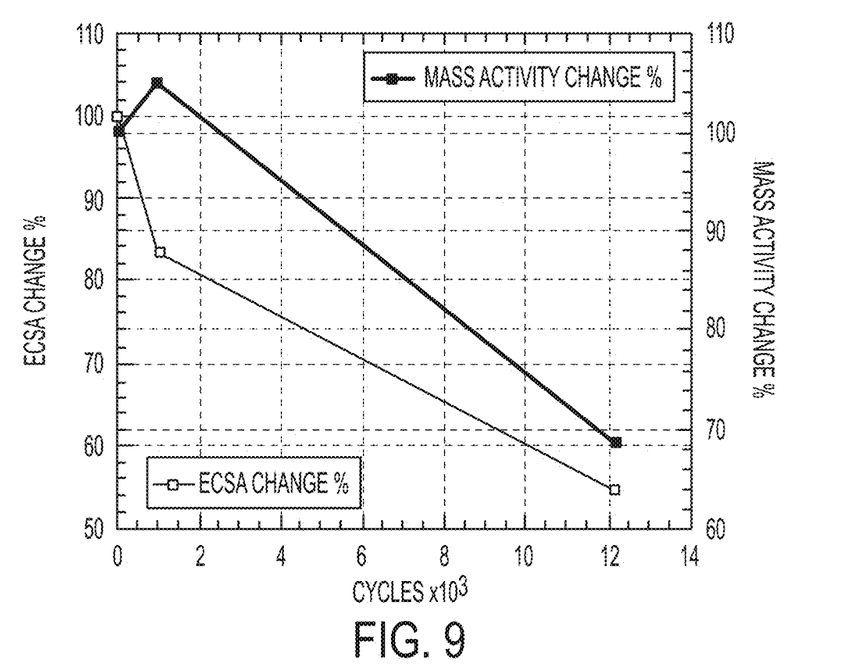
FIG. 9 is the results of ECSA and mass activity tests performed with the stress tests of FIGS. 6A and 6B.

FIG. 9 shows the change in ECSA and mass activity during cycling of a Pt—NbOx-graphene ORR catalyst. The catalyst was prepared with a Pt loading of 5 wt % (total loading of 0.6 μg) and had a specific activity of 1,493 μA/cm² Pt. The initial ECSA was 21.33 $m^2/g_{Pt}$ and the initial mass activity was 318.4 $A/g_{Pt}$. As shown, after over 12,000 cycles, the ECSA of the Pt—NbOx-graphene ORR catalyst changes less than 50%. Compared to Pt-carbon catalysts, which may show similar ECSA change in half the cycles or less, the Pt—NbOx-graphene ORR catalyst shows greatly enhanced durability. The mass activity of the Pt—NbOx-graphene ORR catalyst changed just over 30% after over 12,000 cycles, also demonstrating good durability.

Figure 10A:
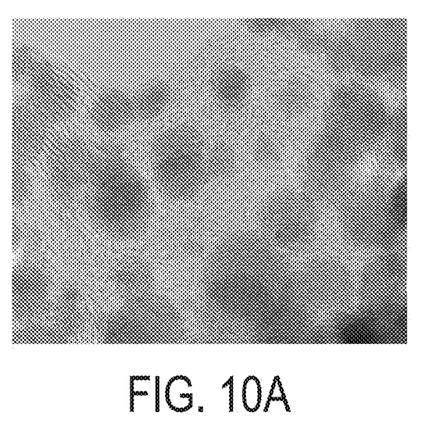
FIGS. 10A-10C are high resolution transmission electron microscope images of the ORR catalyst as-prepared, after the stress test of FIG. 6A, and after the stress test of FIG. 6B, respectively.
Figure 10B:
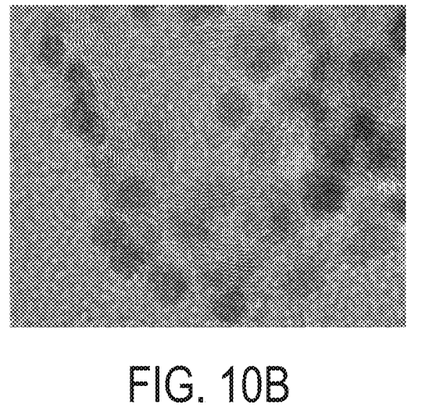
Figure 10C:
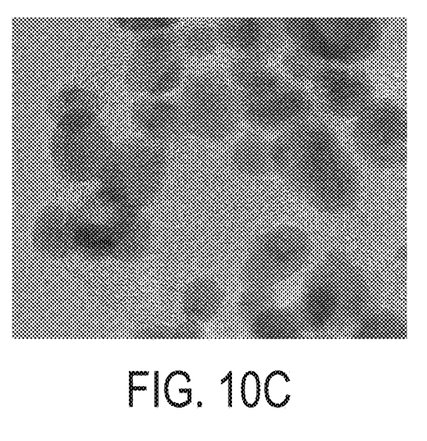

FIG. 10A shows a High Resolution TEM (HRTEM) image of the Pt—NbOx catalyst as-prepared. As shown in the image, the Pt is well-crystalized and primarily grew onto the amorphous NbOx, as deposited. Portions of the Pt have formed a 2-D electrically connected network. FIG. 10B shows the Pt—NbOx catalyst after the substrate stress test of FIG. 7A after 20,000 cycles. As shown, the morphology of the Pt and the Pt particle size is substantially unchanged compared to the as-prepared catalyst. FIG. 10C shows the Pt—NbOx catalyst after the catalyst stress test of FIG. 7B after 20,000 cycles. As shown, the Pt size has grown, however, the Pt is still deposited on the amorphous NbOx and the 2-D electrically interconnected structure of the Pt remains intact.

Figure 11:
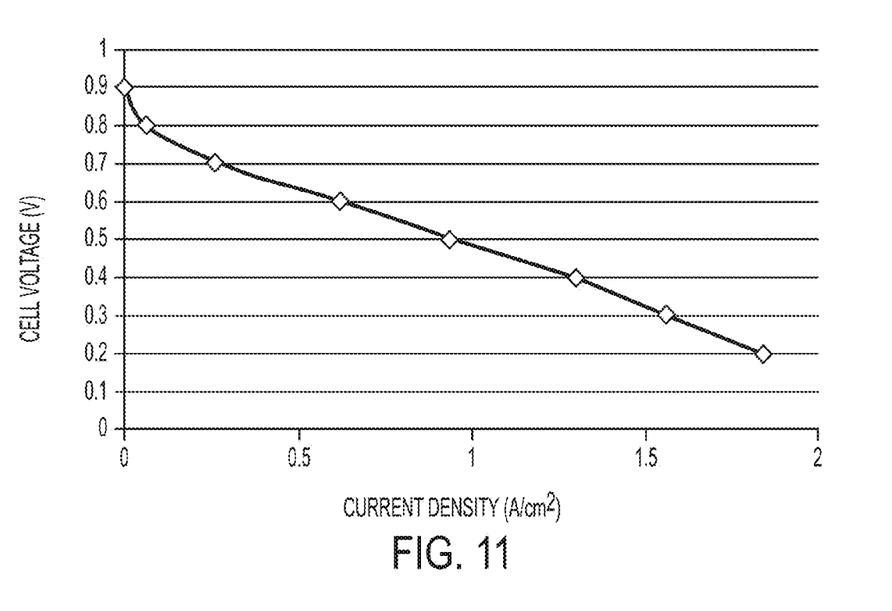
FIG. 11 is an initial polarization curve of a single fuel cell including a disclosed ORR catalyst.

With reference to FIG. 11, an initial polarization curve is shown for a 5 cm² single cell including a Pt—NbOx catalyst with a cathode Pt loading of 0.07 mg/cm², which is about one third the loading of a typical PEMFC cathode. The polarization curve is similar to those of typical PEMFC cathodes, despite the reducing Pt loading. Therefore, similar performance may be achieved while using less platinum, which forms a significant portion of the overall cost of the fuel cell. Alternatively, if the Pt loading is increased, performance may be improved over conventional fuel cell catalysts.

Without being held to any particular theory, it is believed that the disclosed metal oxide stabilized Pt-based ORR catalysts exhibit increased durability and stability due, at least in part, to pinning of the platinum atoms, thereby preventing or mitigating agglomeration and dissolution. The pinning is a result of several factors. One factor is the amorphous metal oxide layer (e.g., NbOx), which forms a stronger bond with the Pt atoms compared to graphitized carbon, alone. In addition, it has been found that the atomic spacing of amorphous metal oxides (even higher surface energy than the crystalline counterpart) is more advantageous for bonding to the Pt atoms, compared to crystalline metal oxides. The Pt grown on amorphous metal oxides (e.g., NbOx) has an atomic distance that is more favorable for the Pt ORR activity, which is further enhanced through the amorphous NbOx and Pt d-band interaction (d-electron mixing at the interface of the Pt and substrate).

In embodiments where the metal oxide and the platinum are deposited in an alternating fashion, this too helps to pin the platinum atoms in place and prevent or inhibit their migration. As can be seen in FIG. 6, there are more Pt/amorphous metal oxide interfaces when the catalyst is formed using alternating deposition. This results in better control of the atomic distance of Pt—Pt, better pinning and better d-band interaction. The alternating deposition also forms the electrically interconnected Pt network more easily. Surprisingly, it has been found that the catalytic activity is not adversely affected by the alternating configuration, despite some of the Pt layers being at least partially covered on the top and bottom surfaces by the metal oxide. Without being bound by any particular theory, it is believed that the electrically interconnected structure of the Pt layers may play a role in the undiminished activity, as well as the open, discontinuous network formed by the metal oxide layers that may provide air at the cathode access to the sides of the Pt layers.

It has been found that the disclosed metal oxide stabilized Pt-based ORR catalysts have substantially increased durability compared to Pt-carbon catalysts. In addition, however, the specific activity of the catalysts is also greatly improved. As discussed above, isolated Pt particles have a specific activity of about 200-400 microamperes per square centimeter (μA/cm²) Pt, which is much lower than the specific activity of bulk platinum (~2,000 μA/cm² Pt). The specific activities of the disclosed ORR catalysts approach or match the bulk platinum specific activity, despite being present at relatively low loadings (e.g., 5-25 wt %). The disclosed metal oxide stabilized ORR catalysts including a graphitized carbon substrate have been found to have a specific activity of at least 1,000 μA/cm² Pt, for example, 1,000-1,500 μA/cm² Pt. The disclosed metal oxide stabilized ORR catalysts including a graphene substrate have been found to have a specific activity of at least 1,200 µA/cm² Pt or at least 1,400 µA/cm² Pt, for example, 1,400-2,00 µA/cm² Pt or 1,500-2,000 µA/cm² Pt. Accordingly, the disclosed ORR catalysts deposited on graphene may have larger specific activities than those deposited on graphitized carbon. The ORR catalysts deposited on graphitized carbon exhibited slightly improved durability compared to the graphene substrate catalysts. However, all embodiments exhibited improved activity and durability compared to conventional Pt-carbon ORR catalysts.

In one example, an ORR catalyst with NbOx overlaying a graphitized carbon powder and a Pt catalyst overlying the niobium oxide layer was formed as follows. Graphitized carbon powder having a particle size of about 30 nm was loaded into a temperature controlled arc plasma device. Maintaining the temperature between 250° C. and 650° C., 20,000 pulses of NbOx deposition were performed followed by 20,000 pulses of Pt deposition in the sequential process as shown in FIG. 5A.

In another example, an ORR catalyst with niobium oxide overlaying the substrate and a catalyst overlying the niobium oxide layer was formed as follows. Highly graphitized carbon powders of 30 nm particle size were loaded into a sample dispersion system inside a vacuum sputtering chamber. The vacuum chamber was pumped to $10^{-6}$ Torr using turbo molecular pumps model Turbovac TMP 151 from Oerlikon Leybold Vacuum. Next, the powders were heated to 350° C. and dispersed using a mechanical stirring system to yield a graphitized carbon substrate. The thin films were deposited onto the substrate by physical vapor deposition (PVD) using a cathode for DC magnetron sputtering. The source for the amorphous niobium oxide layer was a niobium oxide target 3 inches in diameter by 0.25 inches thick. A Pt-based target of pure metal, and of the same dimensions, was used as the target for the platinum catalyst layer. One thousand standard cubic centimeters per minute (sccm) of argon gas was introduced into the vacuum chamber and pumped by a turbo molecular pump backed by a rotary piston mechanical pump to maintain a sputtering pressure of 5 mTorr. The sputtering was sequential, sputtering the amorphous niobium oxide first at 30 watts, followed by sputtering of the Pt catalyst at 30 watts.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An oxygen reduction reaction (ORR) catalyst comprising:
   a carbon substrate;
   a first amorphous metal oxide layer overlying a surface or the substrate;
   a first platinum layer overlying the first metal oxide layer;
   a second amorphous metal oxide layer overlying the first platinum layer; and
   a second platinum layer overlying the second amorphous metal oxide layer;
   the amorphous metal oxide layers including a plurality of discontinuous elongated structures.

2. The ORR catalyst of claim 1, wherein the platinum layers have a thickness of 1 to 20 atomic layers.

3. The ORR catalyst of claim 1, wherein the platinum layers each include an electrically interconnected network of platinum.

4. The ORR catalyst of claim 3, wherein the electrically interconnected network of platinum forms a plurality of openings within the network.

5. The ORR catalyst of claim 1, wherein the first and second platinum layers are substantially discrete from each other and separated by the second amorphous metal oxide layer.

6. The ORR catalyst of claim 1, wherein the OR catalyst has a specific activity of at least 1,000 µA/cm² Pt.

7. The ORR catalyst of claim 1, wherein the ORR catalyst has a specific activity of 1,200 µA/cm² Pt to 2,000 µA/cm² Pt.

8. The ORR catalyst of claim 1, wherein the platinum layer includes pure platinum or a platinum alloy.

9. The ORR catalyst of claim 1, wherein the amorphous metal oxide layers include a plurality of discontinuous elongated structures having a long axis of 2 to 50 nm and a short axis of 1 to 10 nm.

10. The ORR catalyst of claim 1, wherein the amorphous metal oxide layer includes a niobium oxide material.

11. The ORR catalyst of claim 1, wherein the carbon substrate includes graphitized carbon or graphene.

12. A fuel-cell cathode oxygen reduction reaction (ORR) catalyst comprising:
    a carbon substrate; and
    a plurality of alternating layers of amorphous metal oxide and platinum catalyst material overlying the substrate;
    the layers of amorphous metal oxide including a plurality of discontinuous elongated structures and the layers of platinum catalyst material each including an electrically interconnected network of platinum;
    wherein the ORR catalyst has a specific activity of at least 1,000 µA/cm² Pt.

13. The ORR catalyst of claim 12, wherein the plurality of alternating layers includes from 2 to 10 layers each of the amorphous metal oxide and the platinum catalyst material.

14. The ORR catalyst of claim 12, wherein the carbon substrate includes graphitized carbon or graphene, the layers of amorphous metal oxide include niobium oxide, and the layers of platinum catalyst material include pure platinum or a platinum alloy.

15. The ORR catalyst of claim 12, wherein the ORR catalyst has a specific activity of 1,200 µA/cm² Pt to 2000 µA/cm² Pt.

16. The ORR catalyst of claim 12, wherein a first layer of amorphous metal oxide is in contact with the carbon substrate and the layers of platinum catalyst material are substantially discrete from each other and separated by the layers of amorphous metal oxide.

17. The ORR catalyst of claim 12, wherein the layers of platinum catalyst have a thickness of 2 to 5 atomic layers.

18. A method of forming an oxygen reduction reaction (ORR) catalyst comprising:
    depositing a first metal oxide layer onto a carbon substrate, a first platinum layer onto the metal oxide layer, a second metal oxide layer onto the first platinum layer, and a second platinum layer onto the second metal oxide layer to form alternating layers of platinum and amorphous metal oxide including a plurality of discontinuous elongated structures.

19. The method of claim 18, wherein the depositing of the first and second platinum layers includes depositing from 1 to 20 atomic layers of platinum or platinum alloy.

20. The method of claim 18, wherein the depositing of the first and second platinum layers each include depositing an electrically interconnected network of platinum or platinum alloy.

* * * * *